US012412442B2

(12) United States Patent
Hendricks et al.

(10) Patent No.: US 12,412,442 B2
(45) Date of Patent: Sep. 9, 2025

(54) UPGRADEABLE SYMBOL FEATURE SYSTEMS AND METHODS FOR A GAMING ENVIRONMENT

(71) Applicant: Aristocrat Technologies, Inc., Las Vegas, NV (US)

(72) Inventors: Bradley Hendricks, Las Vegas, NV (US); Allon Englman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 398 days.

(21) Appl. No.: 17/822,748

(22) Filed: Aug. 26, 2022

(65) Prior Publication Data

US 2023/0099795 A1 Mar. 30, 2023

Related U.S. Application Data

(60) Provisional application No. 63/261,637, filed on Sep. 24, 2021.

(51) Int. Cl.
*G07F 17/32* (2006.01)
*G06F 7/58* (2006.01)
*G07F 17/34* (2006.01)

(52) U.S. Cl.
CPC .......... *G07F 17/3213* (2013.01); *G06F 7/588* (2013.01); *G07F 17/3244* (2013.01); *G07F 17/3267* (2013.01)

(58) Field of Classification Search
CPC .................. G07F 17/3244; G07F 17/3267
See application file for complete search history.

(56) References Cited

U.S. PATENT DOCUMENTS

| | | | |
|---|---|---|---|
| 5,833,537 | A | 11/1998 | Barrie |
| 5,935,002 | A | 8/1999 | Falciglia |
| 6,186,894 | B1 | 2/2001 | Mayeroff |
| 7,237,775 | B2 | 7/2007 | Thomas |

(Continued)

FOREIGN PATENT DOCUMENTS

AU 2019204175 2/2020

OTHER PUBLICATIONS

Notice of Allowance dated Oct. 27, 2021 for U.S. Appl. No. 16/948,606 (pp. 1-8).

(Continued)

*Primary Examiner* — Thomas H Henry
(74) *Attorney, Agent, or Firm* — Armstrong Teasdale LLP

(57) ABSTRACT

A gaming device is provided. The gaming device may be configured to, determine that at least a first base prize symbol is displayed in a first matrix position of a matrix of a game display, the first base prize symbol being associated with a first prize amount, cause the game display to display, in the first matrix position, a first transparent prize symbol, the first transparent prize symbol being associated with the first prize amount, in response to a bonus game instance, generate at least one special symbol in the matrix, determine that the at least one special symbol is displayed in the first matrix position that includes the first transparent prize symbol, and display a second transparent prize symbol in the first matrix position, the second transparent prize symbol being associated with a second prize amount greater than the first prize amount.

18 Claims, 13 Drawing Sheets

(56) References Cited

U.S. PATENT DOCUMENTS

| | | | |
|---|---|---|---|
| 7,445,547 | B2 | 11/2008 | Suzuki |
| 7,780,519 | B2 | 8/2010 | Gomez |
| 8,172,665 | B2 | 5/2012 | Hoffman |
| 8,226,468 | B2 | 7/2012 | Hoffman |
| 8,371,928 | B2 | 2/2013 | Englman |
| 8,388,438 | B2 | 3/2013 | Englman |
| 8,460,092 | B1 | 6/2013 | Slomiany |
| 8,591,308 | B2 | 11/2013 | Hoffman |
| 9,135,785 | B2 | 9/2015 | Hoffman |
| 9,251,667 | B2 | 2/2016 | Marks |
| 9,449,470 | B2 | 9/2016 | Baerlocher |
| 9,530,287 | B2 | 12/2016 | Hoffman |
| 9,564,006 | B2 | 2/2017 | Ryan |
| 9,600,979 | B2 | 3/2017 | Hornik |
| 9,640,025 | B2 | 5/2017 | Saunders |
| 9,691,231 | B2 | 6/2017 | Fujisawa |
| 9,824,527 | B2 | 11/2017 | Evans |
| 9,836,915 | B2 | 12/2017 | Meyer |
| 9,940,775 | B2 | 4/2018 | Eaton |
| 10,152,845 | B2 | 12/2018 | Pawloski |
| 10,388,112 | B2 | 8/2019 | You |
| 10,403,093 | B1 | 9/2019 | Halvorson |
| 10,410,477 | B2 | 9/2019 | Hoffman |
| 2003/0022712 | A1 | 1/2003 | Locke |
| 2003/0092487 | A1 | 5/2003 | Meyer |
| 2004/0033827 | A1 | 2/2004 | Gilmore |
| 2004/0048646 | A1 | 3/2004 | Martin |
| 2004/0053676 | A1 | 3/2004 | Rodgers |
| 2005/0059459 | A1 | 3/2005 | Dunn |
| 2006/0128465 | A1* | 6/2006 | Schultz .............. G07F 17/3211 463/30 |
| 2006/0189380 | A1 | 8/2006 | Schultz |
| 2007/0026923 | A1 | 2/2007 | Muir |
| 2007/0060265 | A1 | 3/2007 | Marks |
| 2007/0238510 | A1 | 10/2007 | Halprin |
| 2008/0026831 | A1 | 1/2008 | Wright et al. |
| 2008/0242404 | A1 | 10/2008 | Aoki |
| 2009/0075717 | A1* | 3/2009 | Jaffe ...................... G07F 17/34 463/20 |
| 2009/0325681 | A1 | 12/2009 | Englman |
| 2010/0124972 | A1 | 5/2010 | Rodgers |
| 2010/0298041 | A1 | 11/2010 | Berman |
| 2011/0045894 | A1 | 2/2011 | Owen |
| 2011/0124405 | A1 | 5/2011 | Okada |
| 2012/0172107 | A1 | 7/2012 | Acres |
| 2012/0202570 | A1 | 8/2012 | Schwartz |
| 2014/0274284 | A1 | 9/2014 | Leupp |
| 2014/0274288 | A1* | 9/2014 | Hornik ................. G07F 17/326 463/20 |
| 2015/0018070 | A1 | 1/2015 | Meyer |
| 2015/0024826 | A1 | 1/2015 | Ghaly |
| 2015/0087382 | A1 | 3/2015 | Gilbertson |
| 2015/0087385 | A1 | 3/2015 | Shiraishi |
| 2015/0094132 | A1 | 4/2015 | Elias |
| 2015/0213672 | A1 | 7/2015 | Elias |
| 2015/0339889 | A1 | 11/2015 | Oropeza |
| 2015/0363999 | A1 | 12/2015 | Little |
| 2016/0093150 | A1 | 3/2016 | Penacho |
| 2016/0203670 | A1 | 7/2016 | Ford |
| 2016/0247361 | A1 | 8/2016 | Meyer |
| 2017/0011582 | A1 | 1/2017 | Fong |
| 2017/0092070 | A1 | 3/2017 | Marston |
| 2017/0200345 | A1 | 7/2017 | Fujisawa |
| 2018/0025585 | A1 | 1/2018 | Schmidt |
| 2018/0025588 | A1 | 1/2018 | Ma |
| 2018/0061176 | A1 | 3/2018 | Berman |
| 2018/0130286 | A1 | 5/2018 | Berman |
| 2018/0268659 | A1 | 9/2018 | Chesworth |
| 2019/0139371 | A1 | 5/2019 | Lamb |
| 2019/0206191 | A1 | 7/2019 | Halvorson |
| 2019/0287336 | A1 | 9/2019 | Prabhu |
| 2019/0304255 | A1 | 10/2019 | San |
| 2020/0051373 | A1 | 2/2020 | Meyer |
| 2020/0111291 | A1 | 4/2020 | Pariseau |
| 2020/0168053 | A1 | 5/2020 | Berman |

OTHER PUBLICATIONS

Aristocrat, Welcome to Fantastic Jackpots—Fantastic Cash, https://www.aristocrat.com/anz/games/welcome-to-fantastic-jackpots-fantastic-cash/, Aug. 2018.
Notice of Allowance dated Apr. 5, 2021 for U.S. Appl. No. 16/538,623 (pp. 1-9).
Notice of Allowance dated Aug. 31, 2021 for U.S. Appl. No. 16/948,606 (pp. 1-9).
Office Action dated Sep. 13, 2021 for U.S. Appl. No. 16/948,607 (pp. 1-16).
Office Action (Non-Final Rejection) dated Dec. 22, 2021 for U.S. Appl. No. 16/950,000 (pp. 1-16).
Notice of Allowance dated Feb. 9, 2022 for U.S. Appl. No. 16/948,606 (pp. 1-2).
Notice of Allowance dated Feb. 23, 2022 for U.S. Appl. No. 16/948,607 (pp. 1-9).
Office Action (Final Rejection) dated Jul. 5, 2022 for U.S. Appl. No. 16/950,000 (pp. 1-15).
Office Action dated Aug. 12, 2021 for U.S. Appl. No. 16/948,308 (pp. 1-17).
Office Action dated Jan. 13, 2022 for U.S. Appl. No. 16/948,308 (pp. 1-6).
Office Action (Non-Final Rejection) dated Mar. 24, 2022 for U.S. Appl. No. 16/948,309 (pp. 1-24).
Office Action (Notice of Allowance and Fees Due (PTOL-85)) dated Jun. 7, 2022 for U.S. Appl. No. 16/948,308 (pp. 1-8).
Office Action (Notice of Allowance and Fees Due (PTOL-85)) dated Sep. 27, 2022 for U.S. Appl. No. 16/948,308 (pp. 1-8).
Office Action (Notice of Allowance and Fees Due (PTOL-85) dated Nov. 3, 2022 for U.S. Appl. No. 17/366,307 (pp. 1-5).
Office Action (Final Rejection) dated Oct. 26, 2022 for U.S. Appl. No. 16/948,309 (pp. 1-23).
Office Action (Notice of Allowance and Fees Due (PTOL-85)) dated Nov. 10, 2022 for U.S. Appl. No. 17/366,307 (pp. 1-2).
Office Action (Notice of Allowance and Fees Due (PTOL-85)) dated Oct. 18, 2023 for U.S. Appl. No. 17/650,202 (pp. 1-2).
Office Action (Non-Final Rejection) dated Oct. 23, 2023 for U.S. Appl. No. 18/297,499 (pp. 1-5).
Office Action (Notice of Allowance and Fees Due (PTOL-85)) dated Dec. 21, 2023 for U.S. Appl. No. 18/297,499 (pp. 1-8).
Office Action (Non-Final Rejection) dated Feb. 2, 2024 for U.S. Appl. No. 17/811,267 (pp. 1-19).
Office Action (Final Rejection) dated Jul. 3, 2024 for U.S. Appl. No. 17/811,267 (pp. 1-14).
Office Action (Non-Final Rejection) dated Jul. 16, 2024 for U.S. Appl. No. 18/322,546 (pp. 1-20).
Office Action (Non-Final Rejection) dated Sep. 23, 2024 for U.S. Appl. No. 18/488,825 (pp. 1-8).
Office Action (Notice of Allowance and Fees Due (PTOL-85)) dated Oct. 1, 2024 for U.S. Appl. No. 17/811,267 (pp. 1-8).
Office Action (Final Rejection) dated Dec. 16, 2024 for U.S. Appl. No. 18/322,546 (pp. 1-11).
Office Action (Notice of Allowance and Fees Due (PTOL-85)) dated Dec. 14, 2022 for U.S. Appl. No. 16/950,000 (pp. 1-8).
Office Action (Notice of Allowance and Fees Due (PTOL-85)) dated Feb. 1, 2023 for U.S. Appl. No. 16/948,308 (pp. 1-8).
Office Action (Notice of Allowance and Fees Due (PTOL-85)) dated Feb. 8, 2023 for U.S. Appl. No. 16/948,309 (pp. 1-9).
Office Action (Notice of Allowance and Fees Due (PTOL-85)) dated Mar. 16, 2023 for U.S. Appl. No. 16/948,309 (pp. 1-2).
Office Action (Non-Final Rejection) dated Mar. 27, 2023 for U.S. Appl. No. 17/650,202 (pp. 1-8).
Office Action (Notice of Allowance and Fees Due (PTOL-85)) dated May 11, 2023 for U.S. Appl. No. 16/948,308 (pp. 1-2).
Office Action (Notice of Allowance and Fees Due (PTOL-85)) dated Jul. 10, 2023 for U.S. Appl. No. 17/650,202 (pp. 1-8).

* cited by examiner

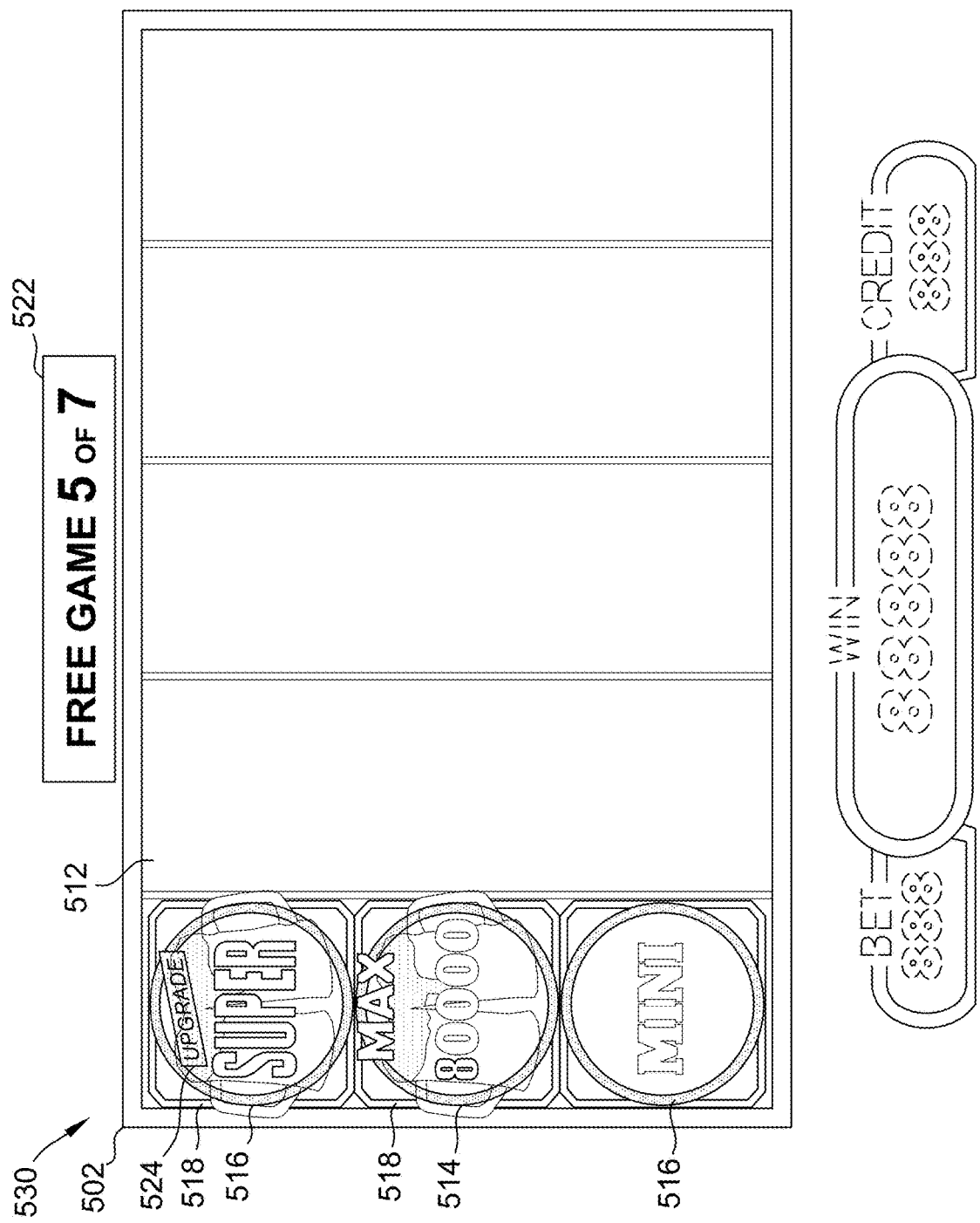

UPGRADEABLE SYMBOL FEATURE SYSTEMS AND METHODS FOR A GAMING ENVIRONMENT

CROSS-REFERENCE TO RELATED APPLICATIONS

This application claims the benefit of priority to U.S. Provisional Patent Application Ser. No. 63/261,637, filed Sep. 24, 2021, the contents and disclosures of which are hereby incorporated herein by reference in its entirety.

TECHNICAL FIELD

The field of disclosure relates generally to electronic gaming, and more particularly, to a gaming device operation that generates symbols within a matrix that, when displayed in a same matrix position as an existing persistent symbol, result in an enhancement of the existing persistent symbol.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a gaming device is provided. The gaming device may include a game display configured to display a game interface including a matrix having a plurality of matrix positions, a memory device, and a processor in communication with the game display and the memory device. The processor may be configured to, in response to a game instance of a base game, determine that at least one bonus game initiating symbol associated with a bonus game is displayed in the matrix, in response to a bonus game initiating symbol being displayed in matrix, determine that at least a first base prize symbol is displayed in a first matrix position of the matrix, the first base prize symbol being associated with a first prize amount, cause the game display to display, in the first matrix position, a first transparent prize symbol, the first transparent prize symbol being associated with the first prize amount, in response to a bonus game instance, generate at least one special symbol in the matrix, determine that the at least one special symbol is displayed in the first matrix position that includes the first transparent prize symbol, and in response to the determination that the at least one special symbol is displayed in the first matrix position, display a second transparent prize symbol in the first matrix position, the second transparent prize symbol being associated with a second prize amount greater than the first prize amount.

In another aspect, a method is provided. The method may be performed by a gaming system that includes a processor in communication with a memory device and a game display configured to display a game interface including a matrix having a plurality of matrix positions. The method may include determining that at least one bonus game initiating symbol associated with a bonus game is displayed in the matrix by the game display, in response to the bonus game initiating symbol being displayed in the matrix, identify a first base prize symbol that is displayed in a first matrix position of the matrix by the game display, the first base prize symbol being associated with a first prize amount, causing the game display to display, in the first matrix position, a first transparent prize symbol, the first transparent prize symbol being associated with the first prize amount, causing the game display to generate at least one special symbol in the matrix, determining that the at least one special symbol is displayed in the first matrix position that includes the first transparent prize symbol, and in response to the determination that the at least one special symbol is displayed in the first matrix position, causing the game display to display a second transparent prize symbol in the first matrix position, the second transparent prize symbol being associated with a second prize amount greater than the first prize amount.

In another aspect at least one non-transitory computer-readable media having computer-executable instructions embodied thereon is provided. When executed by a processor in communication with a memory device and a game display configured to display a game interface including a matrix having a plurality of matrix positions, the computer-executable instructions may cause the processor to determine that at least one bonus game initiating symbol associated with a bonus game is displayed in the matrix, in response to a bonus game initiating symbol being displayed in matrix, determine that at least a first base prize symbol is displayed in a first matrix position of the matrix, the first base prize symbol being associated with a first prize amount, cause the game display to display, in the first matrix position, a first transparent prize symbol, the first transparent prize symbol being associated with the first prize amount, generate at least one special symbol in the matrix, determine that the at least one special symbol is displayed in the first matrix position that includes the first transparent prize symbol, and in response to the determination that the at least one special symbol is displayed in the first matrix position, display a second transparent prize symbol in the first matrix position, the second transparent prize symbol being associated with a second prize amount greater than the first prize amount.

BRIEF DESCRIPTION OF THE DRAWINGS

FIGS. 5A, 5B, 5C, 5D, 5E, 5F, and 5G are example screenshots of a sequence of an electronic game, as described herein.

DETAILED DESCRIPTION

Figure 1:
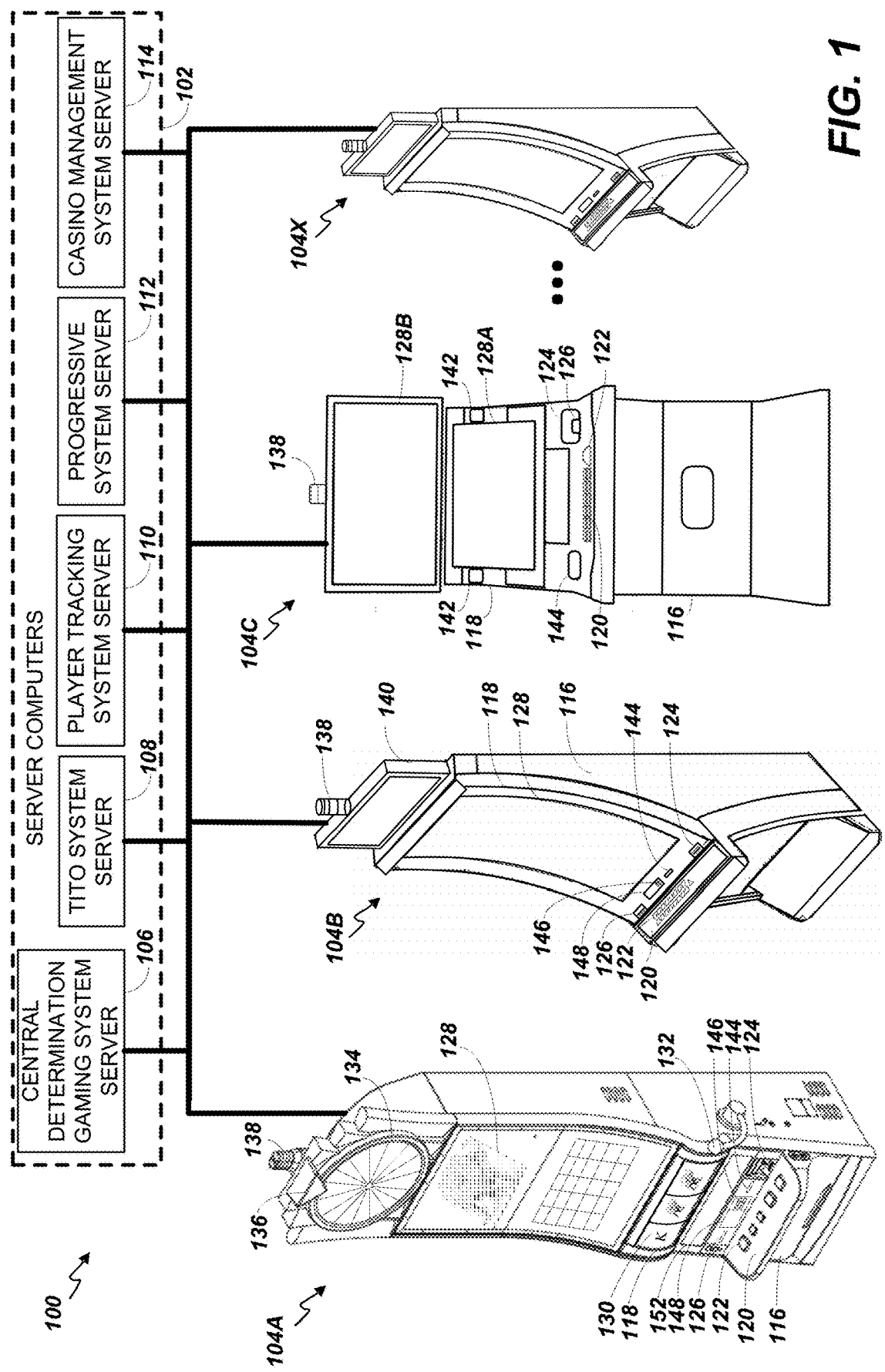
FIG. 1 is an exemplary diagram showing several gaming machines networked with various gaming related servers.

The systems and methods described herein include a gaming device that operates and/or is configured to implement a hold and spin feature. In the example embodiment, in response to a game instance of a base game (e.g., a slot game) performed on the gaming device, the gaming device determines that at least one of a certain symbol (referred to herein as a "bonus game initiating symbol") is displayed. For example, in the base game, different symbols may land in respective positions of a slot game, and if one of the bonus game initiating symbols lands or is displayed in the base game, the gaming device initiates a bonus and/or a secondary game. The bonus game, like the base game, may include a matrix of positions in which symbols on slot reels may fall or be displayed. In the example embodiments, the slot reels from the bonus game and/or secondary game are different from those of the base game (e.g., reels may be swapped out), and as described in further detail below, may include different symbols with unique functions.

Certain other types of symbol, referred to herein respectively as a "base credit value symbol" and a "base prize symbol," may also land or be displayed during the base game. The base credit value symbols have an associated credit value, and the base prize symbols may have an associated prize (e.g., a certain jackpot of a plurality of jackpots), which may be included in the symbol. For example, a base credit value symbol corresponding to 100 credits may include the number "100" within the symbol, or a base prize symbol corresponding to a "mini jackpot" may include the word "mini" within the symbol. When the bonus game is initiated, if one or more of these base credit value symbols and/or base prize symbols are currently displayed, a corresponding symbol, referred to herein respectively as a "transparent credit value symbol" and/or a "transparent prize symbol," is generated in its place. These transparent credit value symbols and transparent prize symbols are "sticky," in that they persist through multiple game instances of the bonus game. Like their corresponding base credit value symbols and base prize symbols, the transparent credit value symbols and transparent prize symbols have a corresponding credit value.

The slot reels for the bonus game may include a combination of blank positions and special or wild symbols. Accordingly, in response to a game instance of the bonus game (e.g., a spin being performed), the at least one special symbol may be generated in one of the slot matrix positions. When this occurs, if the position where the special symbol lands or is displayed includes a transparent credit value symbol and/or a transparent prize symbol, the credit and/or prize associated with the transparent credit value symbol and/or transparent prize symbol may be increased (e.g., doubled, increased by a predetermined amount, or switched to correspond to a higher jackpot). For example, a transparent credit value symbol corresponding to 100 credits may be upgraded to one corresponding to 200 credits, or a transparent prize symbol corresponding to a mini jackpot may be upgraded to one corresponding to a major jackpot having a higher associated value.

If the position where the special symbol lands is blank (e.g., does not include a transparent credit value symbol), a transparent credit value symbol and/or transparent prize symbol may be generated in the position. The credit value and/or prize associated with the generated value may be selected, for example, by evaluating an RNG call against a lookup table. These transparent credit value symbols and/or transparent prize symbols that are generated during the bonus game may also be subsequently upgraded if a special symbol lands in their respective positions.

Bonus game spins may be performed for a set number of turns determined at initiation of the bonus game (e.g., a set number and/or based on a number of bonus game initiating symbols present). In some embodiments, additional bonus game spin credits may be earned if a certain combination of special symbols (e.g., three in a row) lands or is displayed during a bonus game instance. Once no spin credits remain, the gaming machine may calculate a total displayed value based on the credit and/or prize associated with the transparent credit value symbols and/or transparent prize symbols. In other words, the credit values and/or prizes (e.g., jackpots) currently displayed may be summed to determine a total value to be awarded. This value may be transferred a player credit balance, after which the base game may resume.

The display of symbols such as, for example, bonus game initiating symbols, base credit value symbols, base prize symbols, and/or special symbols may be determined by comparing one or more RNG calls performed in association with the game instance with one or more lookup tables stored in a memory. For example, in some embodiments, a separate RNG call and/or a second lookup table may be used for each column to determine which symbols are displayed in that column, which enables each column to have a different probability of displaying certain symbols. Accordingly, evaluating different portions of the display (e.g., each column) separately using a separate RNG call and/or lookup table provides the technical benefits of controlling RTP (return to player) and/or increasing variation in potential game outcomes while maintaining a target RTP.

In some embodiments, lookup tables may be selected for a particular game instance based on a current state of the game. For example, in some embodiments, the probability of displaying certain symbols (e.g., the special symbols) may be increased or decreased depending on the state of the game (e.g., how many transparent credit value symbols and/or transparent prize symbols and/or which transparent credit value symbols and/or transparent prize symbols are currently displayed) by selecting a lookup table that is associated with the current game state from a plurality of stored lookup tables. For example, as a transparent credit value symbol and/or transparent prize symbol approaches its maximum value, the probability of an additional special symbol that will further increase the value and/or prize associated with the transparent credit value symbol and/or transparent prize symbol being displayed may be reduced. Accordingly, selecting a lookup table based on a current state provides the technical benefits of controlling RTP and/or increasing variation in potential game outcomes while maintaining a target RTP.

Additionally, certain technical benefits are realized based upon the present disclosure. For example, a plurality of random determinations may be made (e.g., via a plurality of RNG outcomes and/or a plurality of lookup tables) in order to determine not only one or more game outcomes but also one or more display features. For example, the display of bonus game initiating symbols may be randomly determined; the display of base credit value symbols may be randomly determined; the display of base prize symbols may be randomly determined; the display of special symbols may be randomly determined; and so forth. The amount of random determinations possible in embodiments described herein result in an increased variety of possible game outcomes to be provided and therefore an improved game as it is less likely any outcomes would be repeated (e.g., and/or displayed in the same manner).

Certain display benefits are also realized herein as technical benefits achieved by the present disclosure (e.g., because certain technical problems arise when trying to communicate/display a significant amount of information on a screen of limited size and space). For example, as explained herein, in some embodiments, animations may be displayed during the initiation of the hold and spin feature and/or in response to symbol upgrading to better communicate to a player that the free spin feature and/or the collection is occurring (e.g., an animation during the start of the hold and spin feature and/or when an upgrade to one of the transparent value symbols and/or transparent prize symbols occurs). Accordingly, the present disclosure provides a variety of improvements in communicating information to a player in a limited amount of display space/real estate—thereby providing an improved user interface and/or electronic output to the user.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
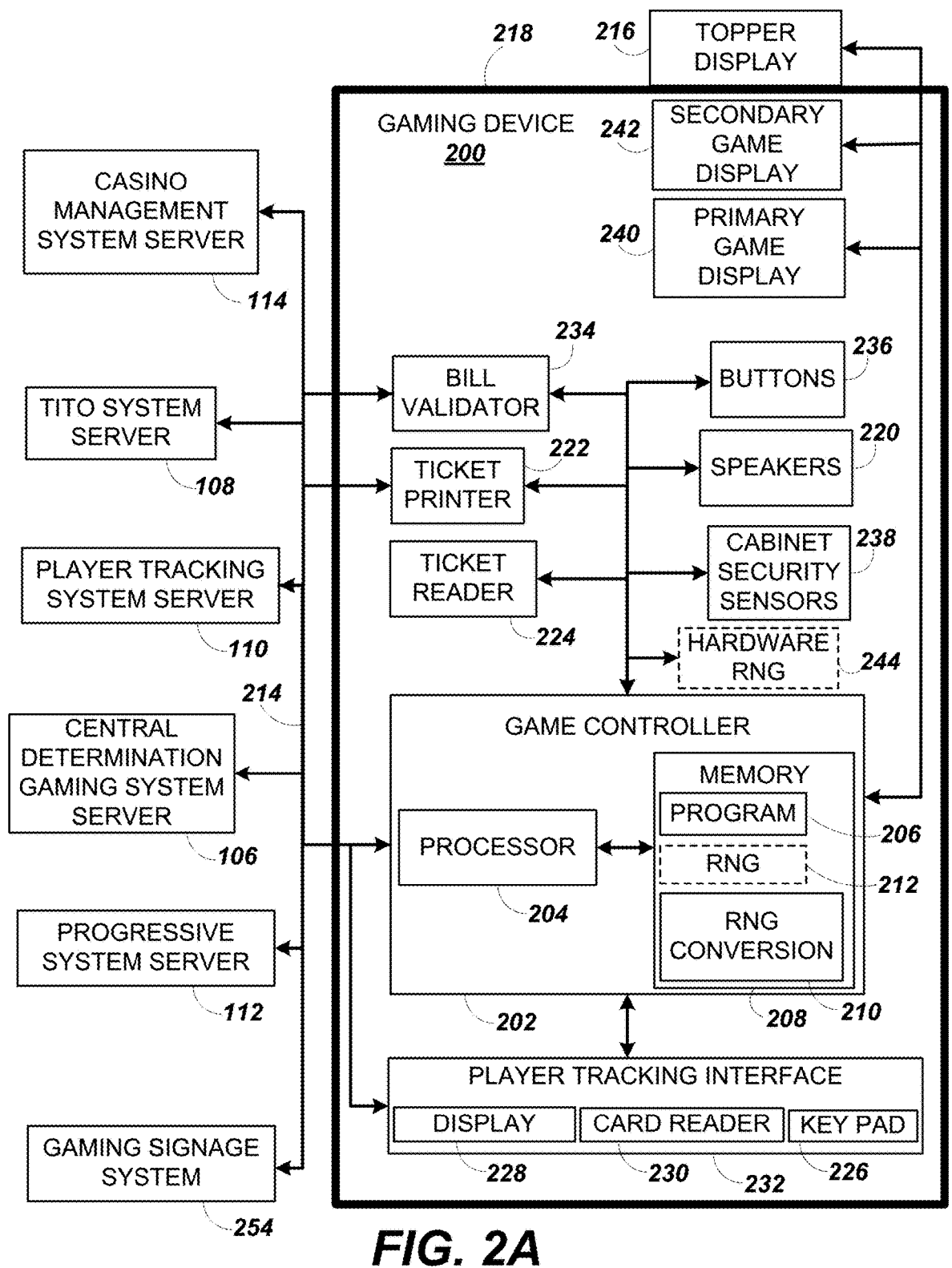
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
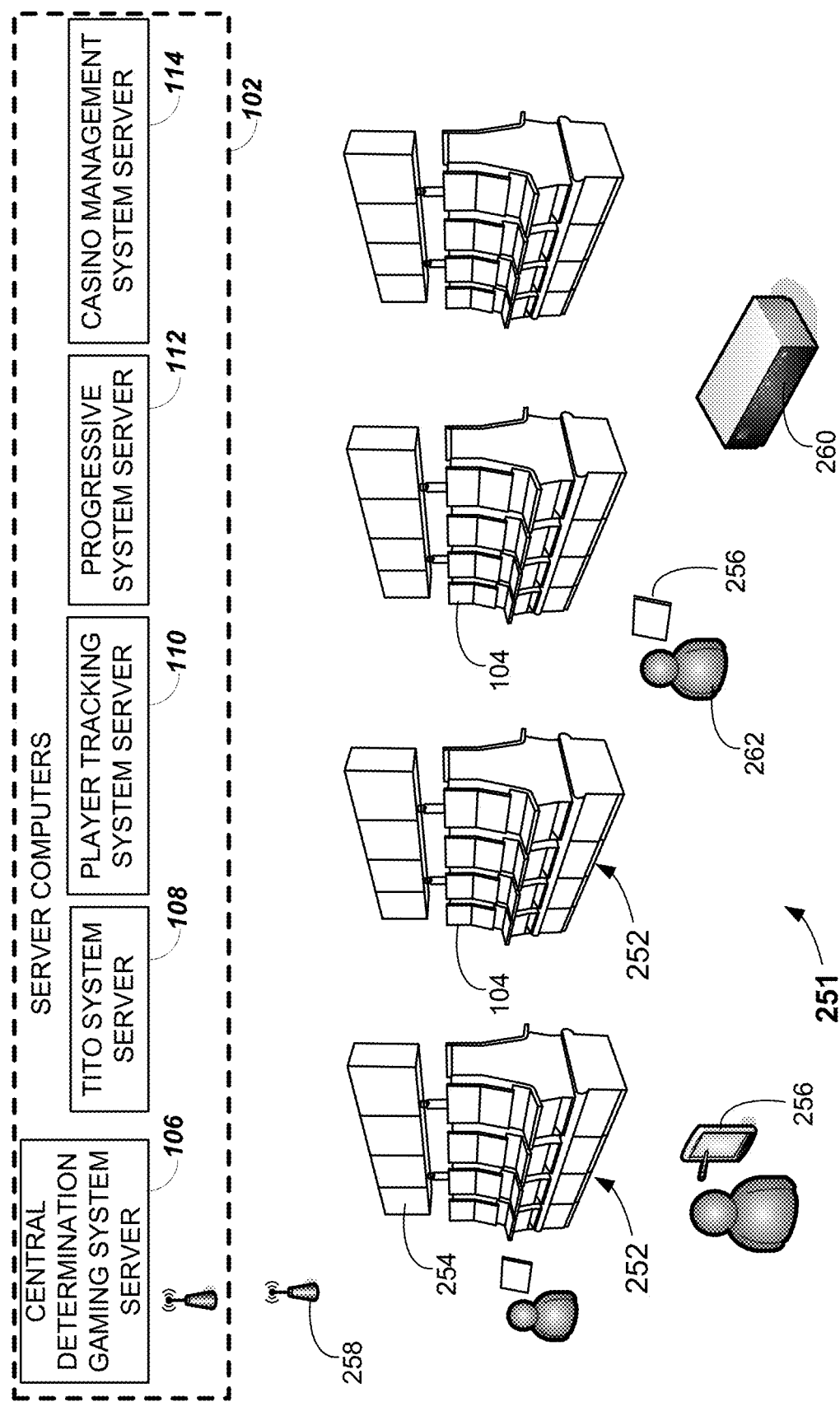
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
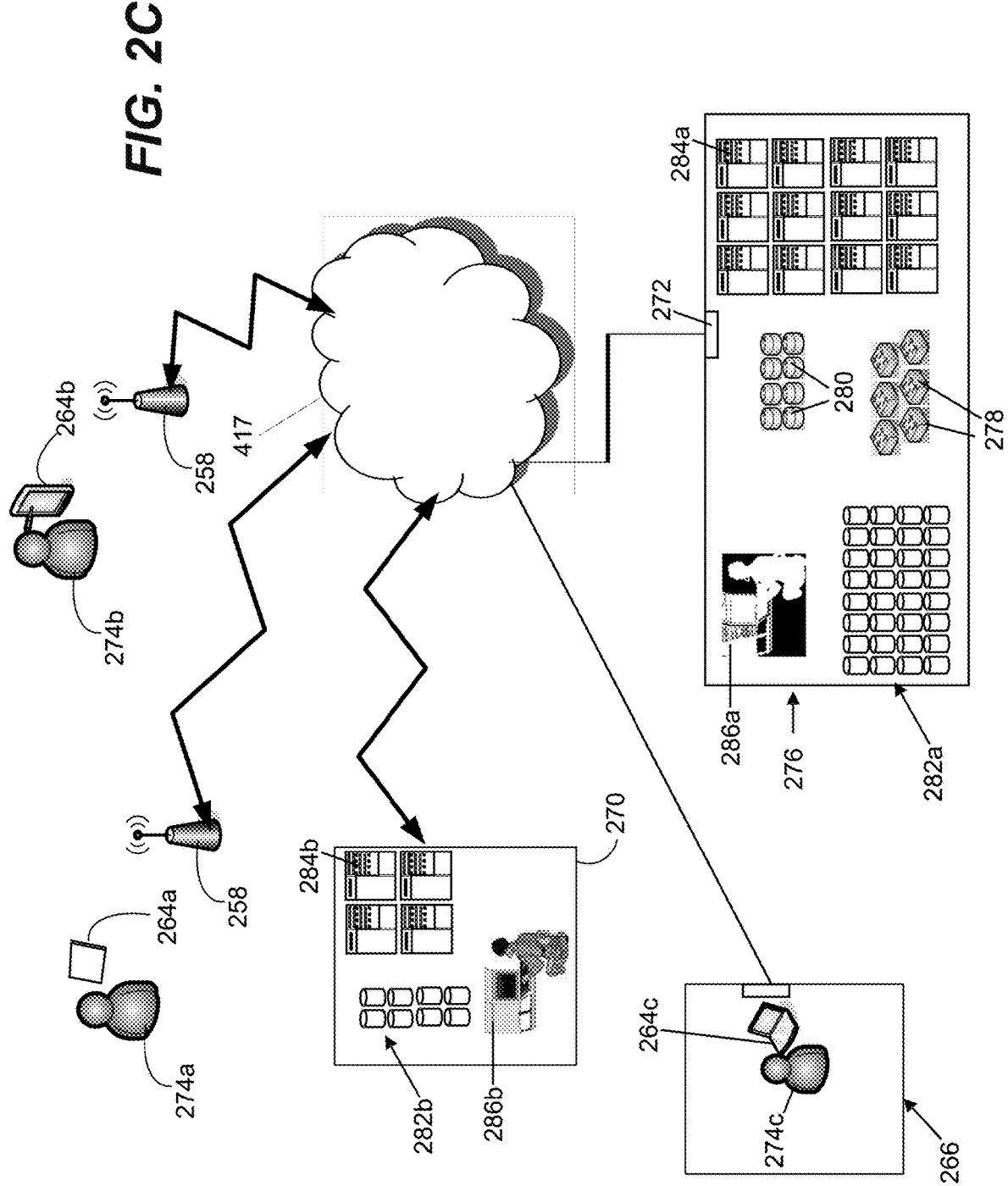
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286b. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
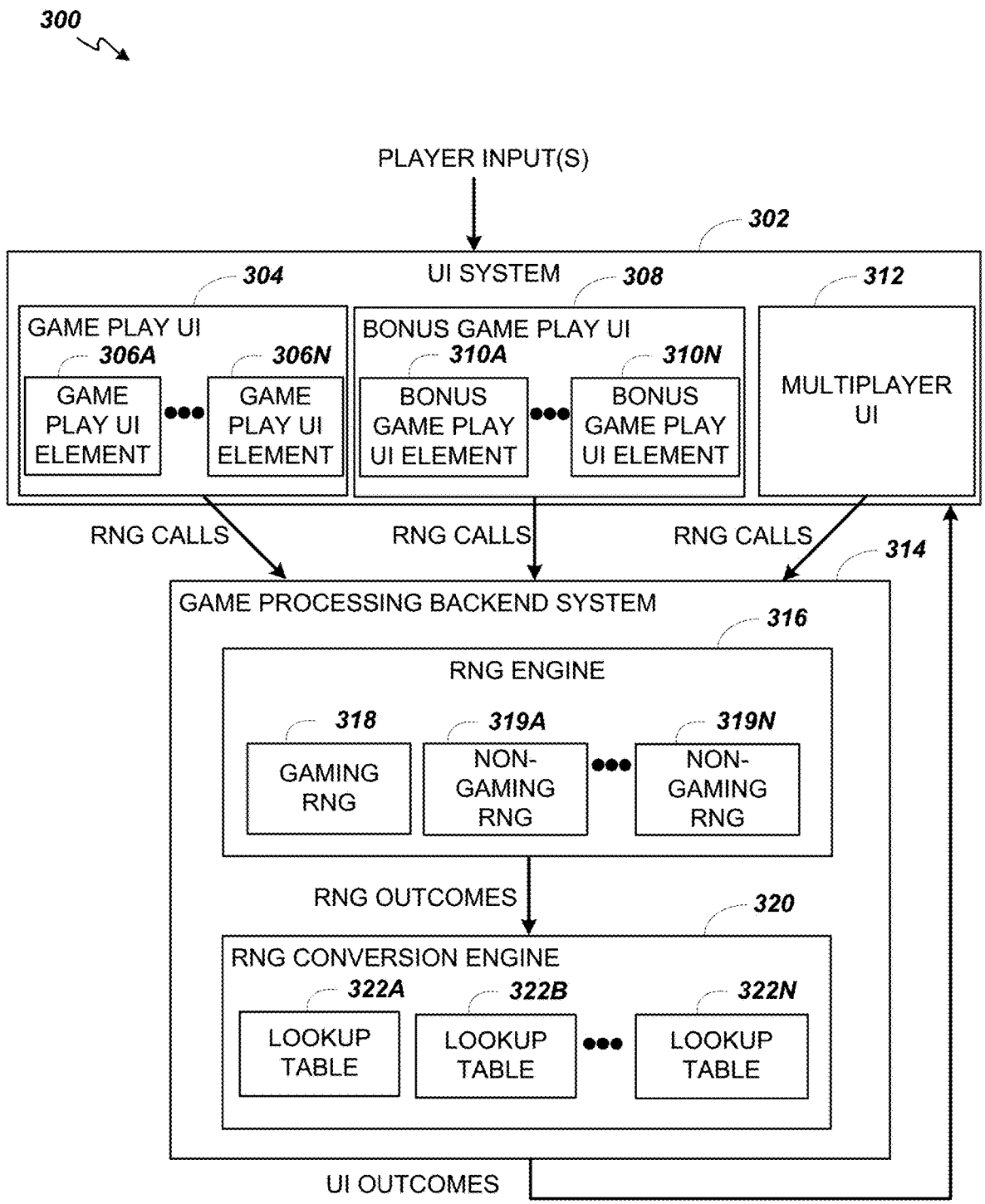
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
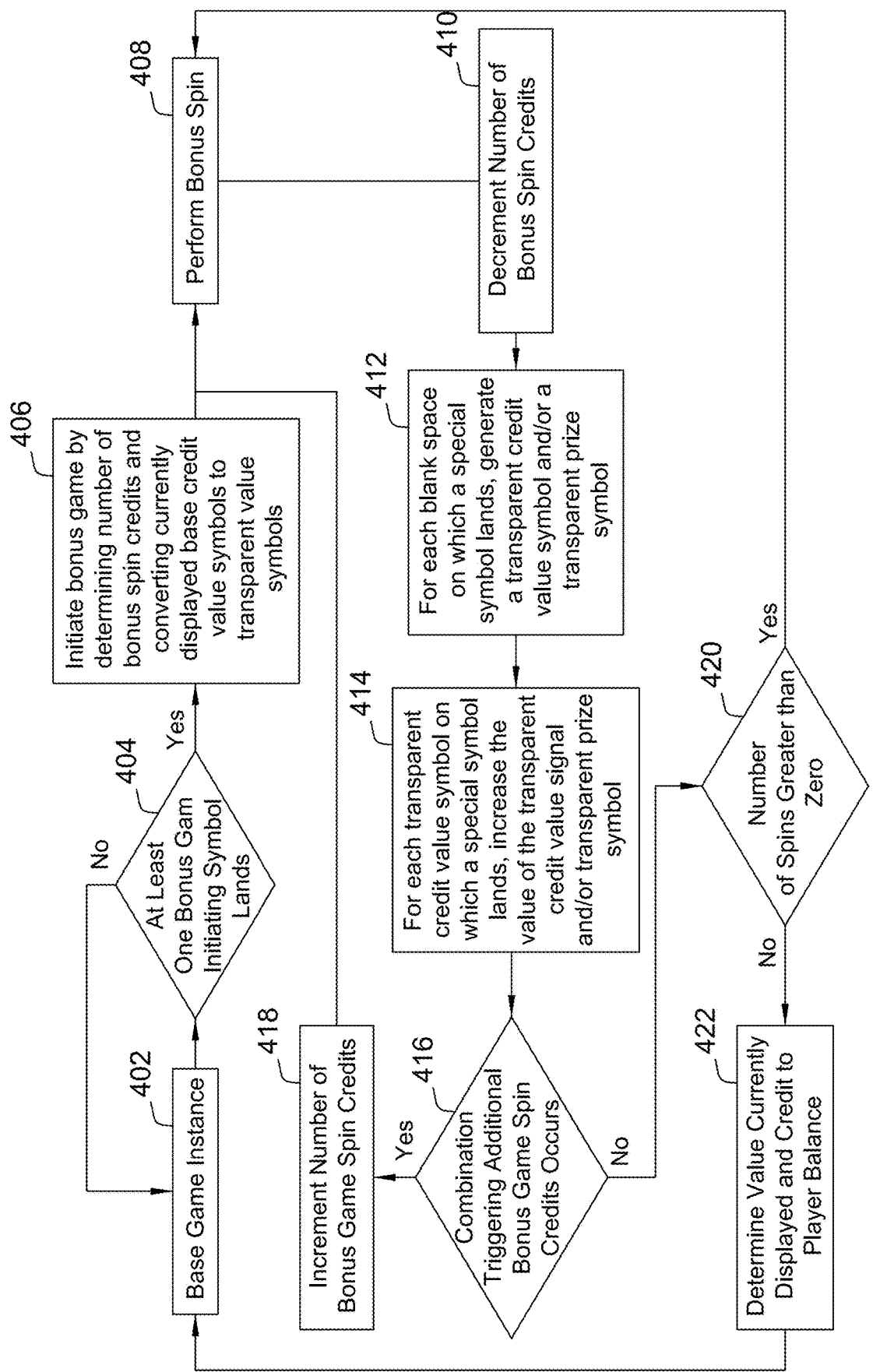
FIG. 4 is a flowchart illustrating an example process for an electronic game played on the systems shown in FIG. 1 having a feature that upgrades the jackpot values.

FIG. 4 is a flowchart illustrating an example process 400 for an example electronic game that provides a hold-and-spin feature with upgradable jackpot symbols. In the example embodiment, process 400 includes executing 402 a game instance of a base game, such as the electronic slot game described with respect to FIGS. 1-3 provided by system 100 at gaming devices 104A-104X (shown in FIG. 1). The base game interface may include a matrix having a plurality of columns (or "reels"), such as five reels, which the display may spin in response to the game instance and land in a position that displays a symbol in one or more rows of the matrix (e.g., three symbols if there are three rows). Accordingly, a slot game matrix having five reels and three symbols displayed per reel (i.e., five columns and three rows) has a game output of a matrix of fifteen symbols in respective matrix positions. The base game may be evaluated to determine a player credit balance to be awarded based on the game output (e.g., the matrix of symbols) and a pay table. Certain special or wild symbols on the base game reels, such as a "bonus game initiating symbol," a "base credit value symbol," and/or a "base prize symbol," as described below, may land or be displayed during the base game.

In the exemplary embodiments, process 400 further includes determining whether the game output includes at least one bonus game initiating symbol. In response to the base game instance, one or more of the bonus game initiating symbols may land or be displayed in the game output matrix. Process 400 further includes, in response to at least one bonus game initiating symbol landing or being displayed, initiating 406 a bonus game. Initiating 406 the bonus game may include determining a number of bonus game spin credits to initially award the user. The bonus game spin credits enable the user to initiate bonus game instances and make spins within the bonus game, and are distinct from player credits that enable spins in the base game. In some embodiments, the number of spin credits may be determined based on the game output of the base game. For example, if a greater number of bonus game initiating symbols land or are displayed in the base game output and/or if the bonus game initiating symbols appear in a certain prescribed pattern (e.g., three or five in a row), a greater number of spin credits may be awarded.

Initiating 406 the bonus game further includes generating a new game interface for the bonus game. The bonus game interface may include the same number of reels and matrix positions as the base game, so that each matrix position in the base game corresponds to a matrix position in the bonus game. The game output of the base game may include one or more base credit value symbols and/or base prize symbols, which each correspond respectively to a specific credit value and/or prize (e.g., jackpot). When the bonus game is initiated, the base credit value symbols and/or base prize symbols are converted into corresponding transparent credit value symbols and/or transparent prize symbols in their respective matrix positions in the bonus game interface. For example, if a base credit value symbol corresponding to 10000 credits has landed in a certain matrix position in the base game when the bonus game is initiated, a transparent credit value symbol corresponding to 10000 credits is generated in the corresponding position of the bonus game, or if a base prize symbol corresponding to a "mini" jackpot is generated in the corresponding matrix position of the base game, a transparent prize symbol corresponding to the "mini" jackpot is generated in the corresponding matrix position of the bonus game. The transparent credit value symbols and/or transparent prize symbols are persistent, or "sticky," in that they remain in place even after additional bonus game spins are made. Base game symbols that are in positions that do not include a base credit value symbol or base prize symbol may be replaced with a blank space upon initiation of the bonus game.

In the example embodiment, process 400 further includes performing 408 a bonus spin and decrementing 410 the bonus game spin credits in response to performing the bonus spin. The bonus spin may be performed in response to input from the user and/or automatically, for example, in response to the expiration of preset time intervals. Each reel position of the bonus game includes either a special symbol or a blank space, so that the special symbols may be displayed in certain matrix positions. Process 400 further includes generating 412, for each currently blank matrix position on which a special symbol lands or is displayed, a new transparent credit value symbol and/or a new transparent prize symbol. The credit value and/or prize corresponding to the generated transparent credit value symbol and/or transparent prize symbol may be randomly selected by evaluating an RNG call based on a lookup table.

Process 400 further includes, for each matrix position in which a special symbol lands or is displayed that is occupied by a transparent credit value symbol, generating 414 a new current transparent credit value symbol and/or transparent prize symbol having an increased associated credit value and/or prize. For example, a multiplier may be applied to the credit value (e.g., the credit value is doubled) corresponding to a transparent credit value symbol, or a transparent prize symbol corresponding to a certain jackpot (e.g., a mini jackpot having a first value) may be upgraded to a transparent prize symbol corresponding to an increased jackpot (e.g., a major jackpot having a larger second value). In some embodiments, the bonus game may be associated with a plurality of jackpots, each having a progressively higher value (e.g., a mini jackpot, major jackpot, a super jackpot, and a grand jackpot). In some embodiments, a particular transparent credit value symbol and/or transparent prize symbol may be upgraded a limited number of times, for example, to comply with regulatory requirements.

In some embodiments, in response to the bonus game instance, one or more RNG calls are analyzed with respect to a separate lookup table stored in memory of a plurality of lookup tables for each column or reel, and the special symbols may be generated based on the analysis of the RNG call for each column. Each of the lookup tables may include a different probability of displaying the at least one special symbol, so that the probability of displaying a special symbol may be relatively higher or lower in certain parts of the game display (e.g., different columns or reels). In some embodiments, a lookup table may be selected based on a current state of the game such as, for example, a number of transparent credit value symbols and/or transparent prize symbols currently displayed and/or a prize amount currently displayed. The special symbols may be generated based on the selected lookup table.

In some embodiments, after each bonus spin, process 400 includes determining 416 whether a combination occurred that triggers an award of additional bonus game spin credits. For example, if a bonus spin outcome includes three or more special symbols landing or being displayed, process 400 may include incrementing the number of bonus game spin credits accordingly before proceeding to execute the next bonus spin.

In the example embodiment, process 400 further includes determining 418, after the bonus spin is performed, whether a current number of bonus spin credits is greater than zero. If the number is greater than zero, another bonus spin may be performed as described above. When the current number of bonus spin credits reaches zero, process 400 includes determining a value to be awarded based on the current display. The currently displayed value may be, for example, a sum of the credit values and/or prizes (e.g., jackpot values) corresponding to the currently displayed transparent credit value symbols and/or transparent prize symbols, a value of the maximum credit value and/or prize currently displayed, or another value calculated based on the currently-displayed credit values and/or prize. The determined amount may be transferred to a player credit balance, after which the bonus game ends and the base game resumes.

Figure 5A:
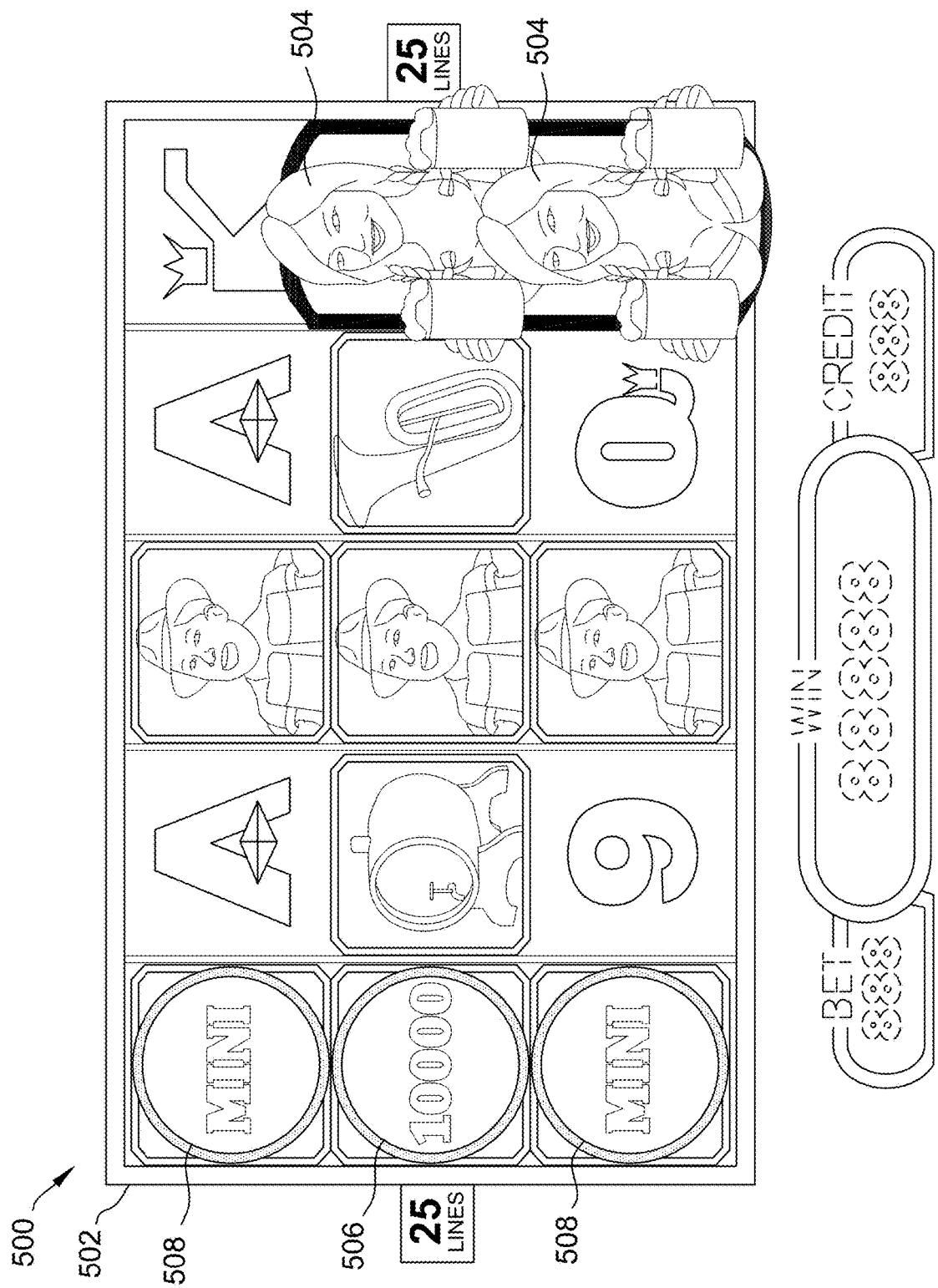

FIGS. 5A, 5B, 5C, 5D, 5E, 5F, and 5G are example screenshots and/or user interfaces 500, 510, 520, 530, 540, 550, and 560 of an electronic game as described herein. Screenshots 500, 510, 520, 530, 540, 550, and 560 may be displayed on, for example, a primary game display 240 one of the EGMs 104. As shown in FIG. 5A, a game outcome of a base slot game includes a plurality of slot positions 502 and may include one or more bonus game initiating symbols 504, shown in the example embodiment as a woman holding a pair of beer mugs, and one or more base credit value symbols 506 and/or base prize symbols 508, shown in the example embodiment as a pair of toasting beer mugs with a value and/or prize overlay (e.g., "10000" corresponding to 10000 credits and "mini" corresponding to a mini jackpot), that have landed in slot positions 502 as a result of the base game. Because at least one bonus game initiating symbol 504 is present, the bonus game initiates in response to the shown base game result.

Figure 5B:
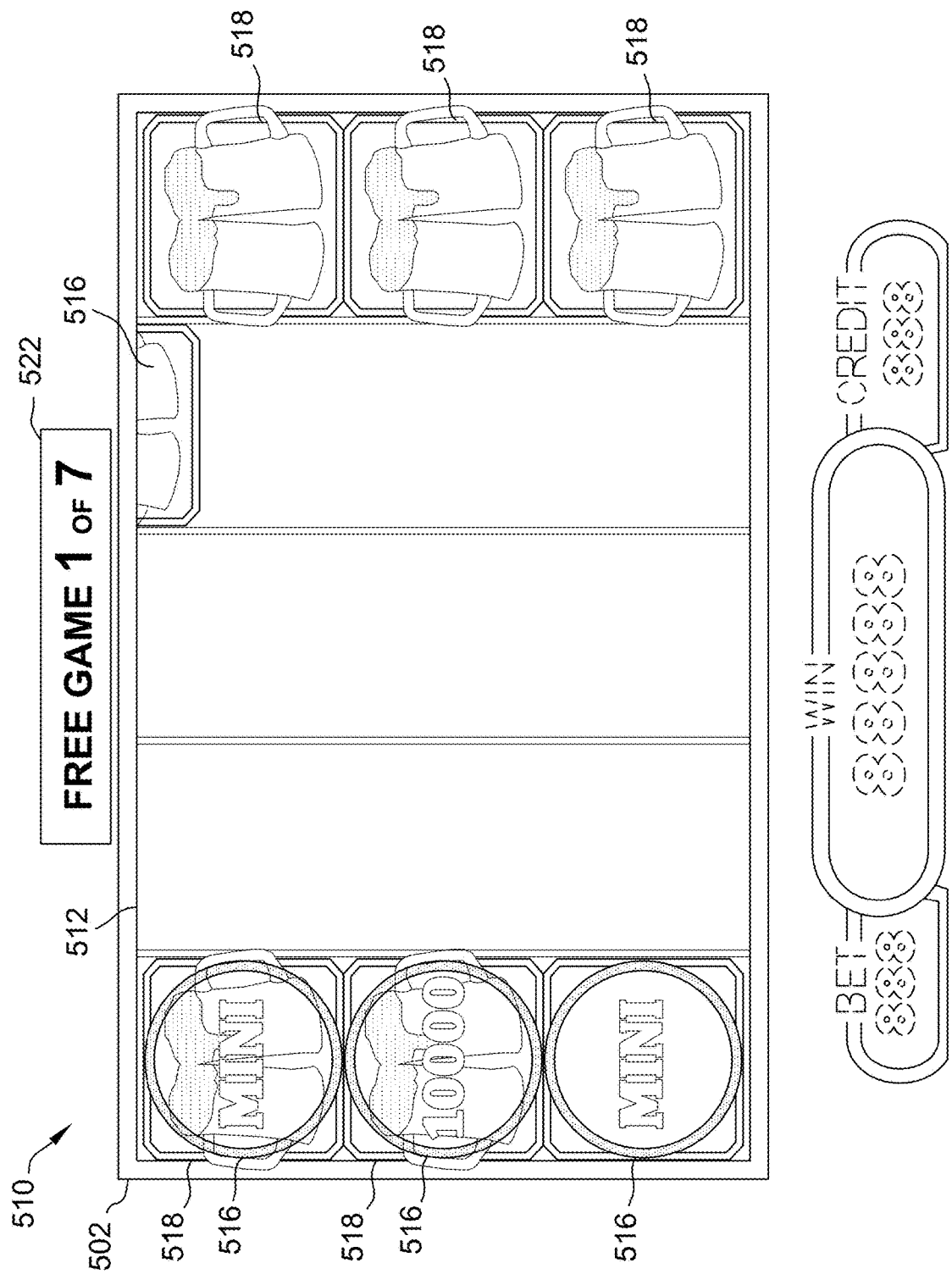

As shown in FIG. 5B, upon initiation of the bonus game, slot positions 502 not occupied by respective base credit value symbols 506 are replaced with blank spaces 512, slot positions 502 occupied by respective base credit value symbols 506 are filled with respective transparent credit value symbols 514, and slot positions 502 occupied by respective base prize symbols 508 are filled with respective transparent prize symbols 516. Transparent credit value symbols 514 and transparent prize symbols 516 are shown in the example embodiment as a transparent overlay including the associated value and/or prize (e.g., "10000" and "mini"). As described above, transparent credit value symbols 514 and/or transparent prize symbols are "sticky," in that they persist between subsequent bonus game spins. Each reel for the bonus game includes special symbols 518, which are shown in the example embodiment as a pair of toasting beer mugs similar to those representing base credit value symbols 506 and base prize symbols 508 but including no overlay. A bonus game spin credit indicator 522 indicates a remaining number of bonus spins.

Figure 5C:
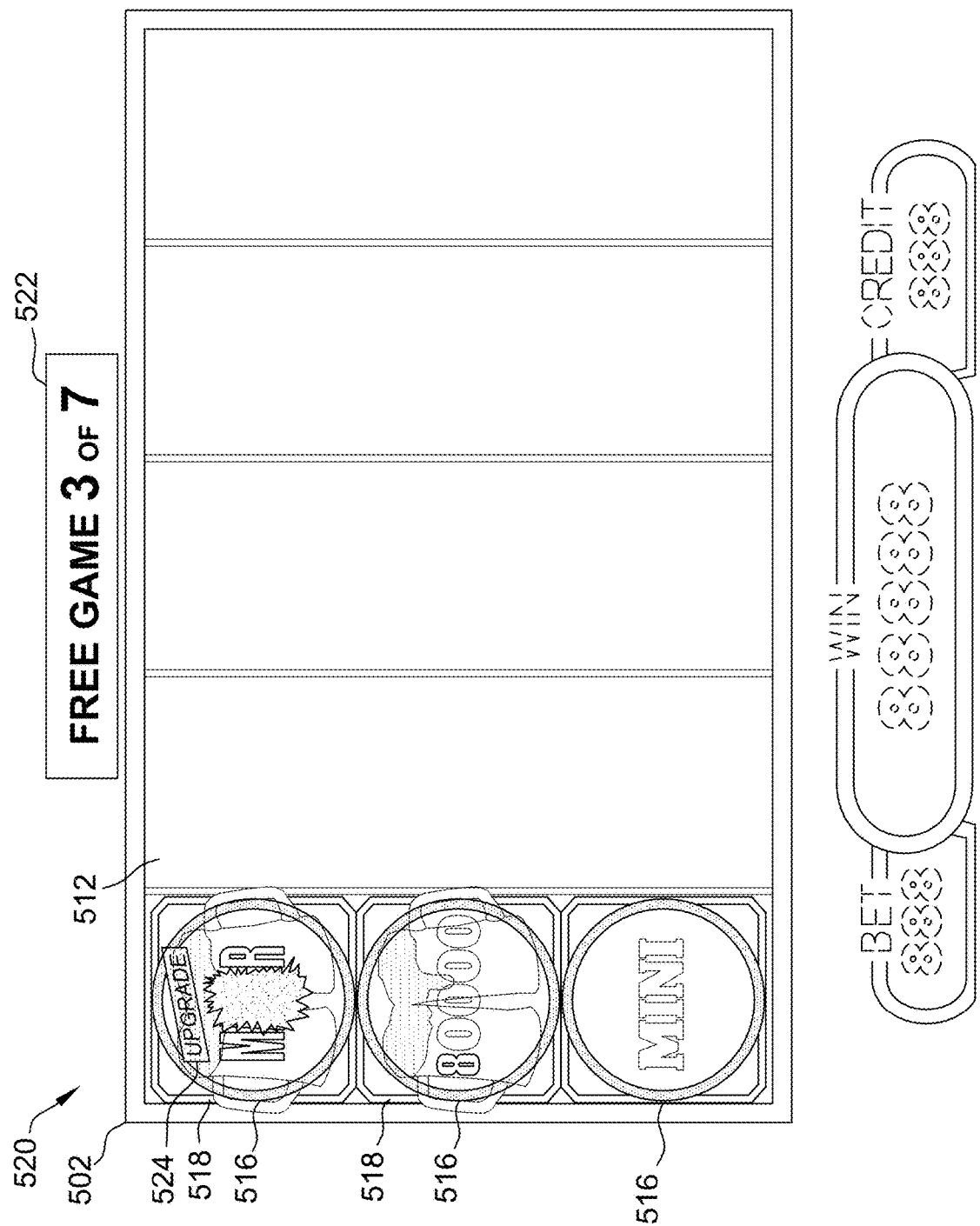

When one of special symbols 518 lands or is displayed in a slot position 502 including a transparent credit value symbols 514, the associated credit value is increased. Likewise, when one of special symbols 518 lands or is displayed in a slot position 502 including a transparent prize symbol 516, the slot position 502 becomes associated with greater value prize (e.g., jackpot). For example, as shown in FIG. 5C, transparent prize symbols 516 corresponding to a "mini" jackpot may be upgraded to transparent prize symbols 516 corresponding to a "major" jackpot having a higher jackpot value, and a transparent credit value symbol 514 corresponding to a value of 10000 may be upgraded to a transparent credit value symbol 514 corresponding to a value of 80000. When transparent credit value symbols 514 and/or transparent prize symbol 516 corresponding to a certain credit value and/or prize is upgraded to a transparent credit value symbols 514 and/or transparent prize symbol 516 corresponding to a higher credit value and/or prize in response to a special symbol 518 landing in its slot position 502, an animation 524 may be displayed to indicate to the user that the upgrade has occurred. As shown in FIG. 5D, additional special symbols 518 landing in these slot positions 502 result in the corresponding transparent prize symbol 516 being upgraded to a transparent prize symbol 516 corresponding to a "super jackpot" having a still higher value. Similarly, as shown in FIG. 5D, the transparent credit value symbol 514 may be further upgraded to a transparent credit value symbol 514 corresponding to a value of 320000.

Figure 5E:
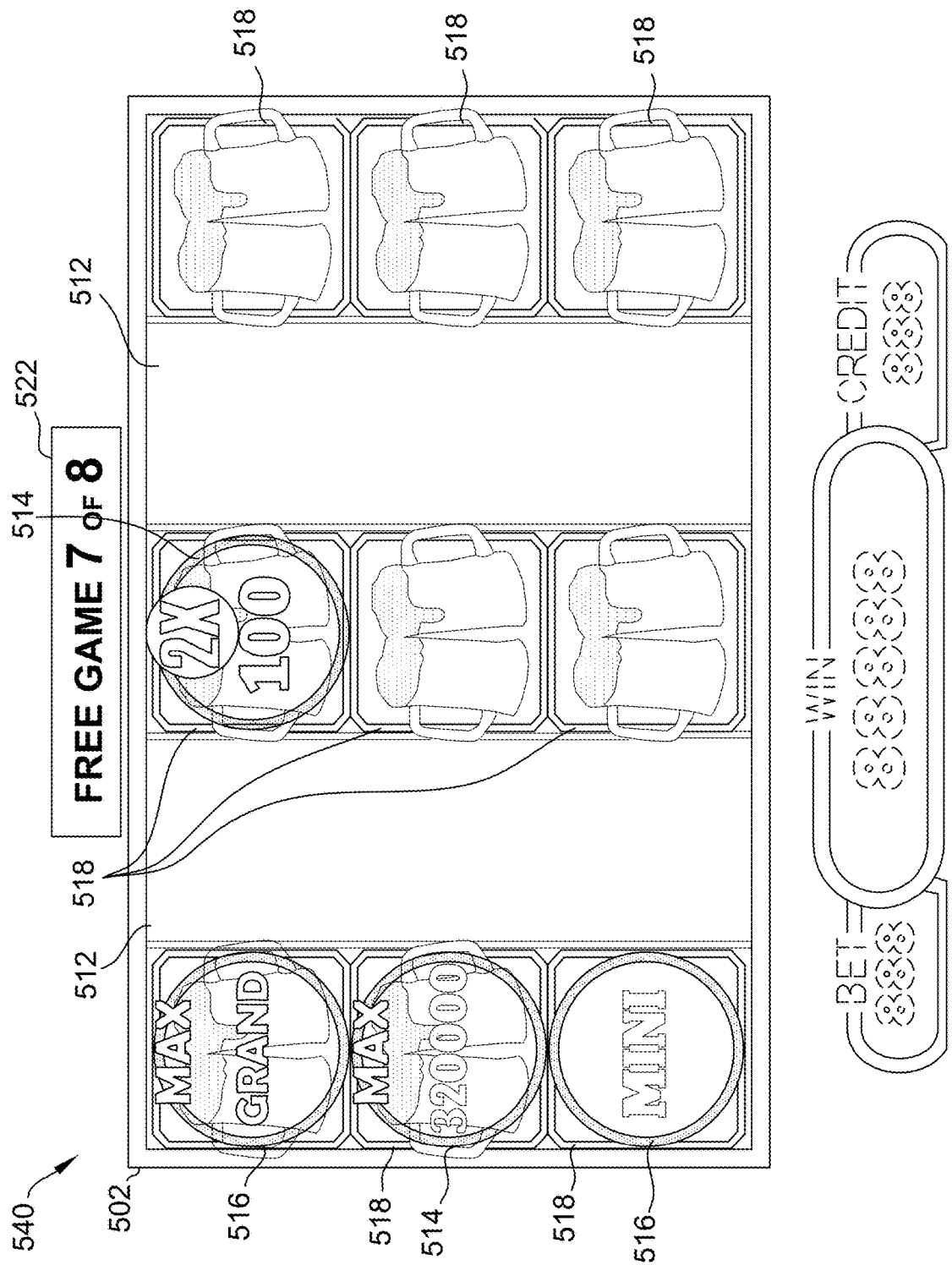
Figure 5F:
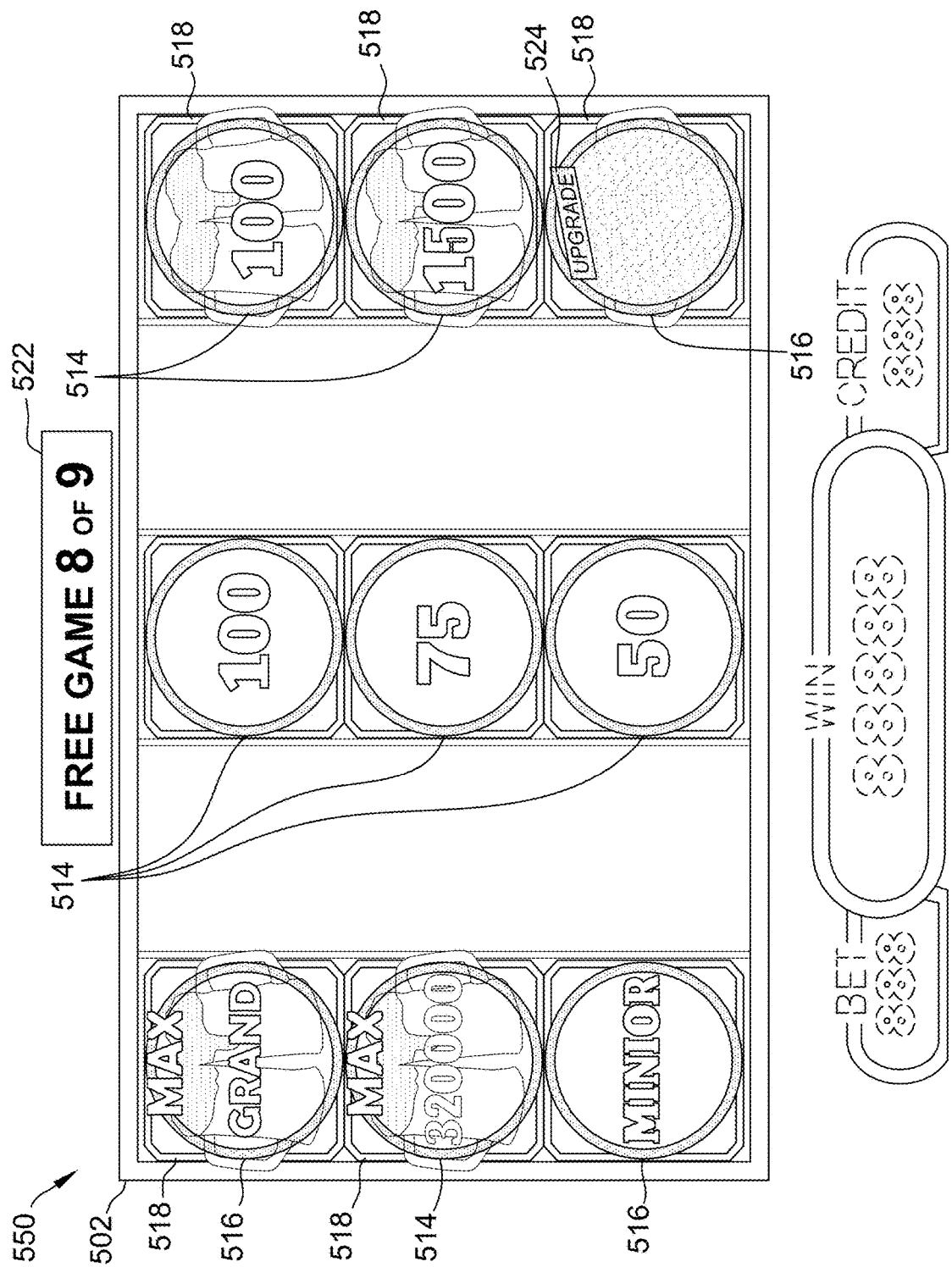
Figure 5G:
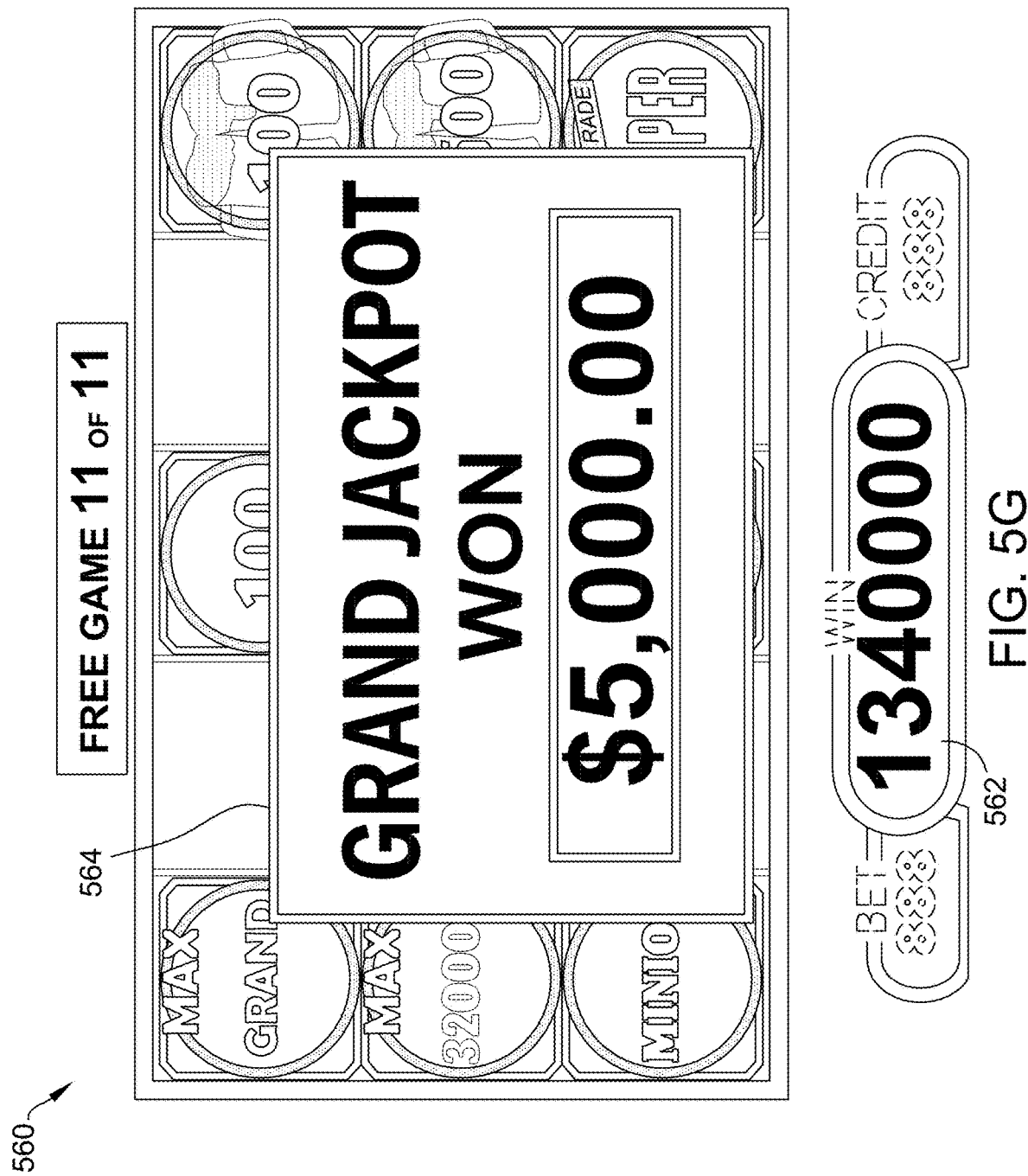

When special symbols 518 land or are displayed in slot positions 502 that are blank, as shown in FIG. 5E, new transparent credit value symbols 514 and/or transparent prize symbols 516 are generated in these slot positions 502, as shown in FIG. 5F. The credit value or prize (e.g., jackpot) associated with the newly generated transparent credit value symbols 514 and/or transparent prize symbols 516 may be selected at random from a list of possible credit values and/or prizes, for example, using an RNG call and a lookup table associating RNG call outputs with different possible credit values and/or prizes. In some embodiments, certain credit values and/or prizes, such as lower values, may be selected more often than other credit values and/or prizes, such as higher values or jackpots. As shown in FIG. 5E, in response to special symbols 518 landing in a certain combination (e.g., three or more special symbols 518 landing), additional bonus game spin credits may be added. As shown in FIG. 5G, when no additional bonus game spin credits remain, a total value 562 corresponding to the transparent credit value symbols 514 and transparent prize symbols 516 is displayed and transferred to a player credit balance of the user. In some embodiments, if any jackpots have been awarded, a corresponding indicator 564 is shown.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A gaming device comprising a game display configured to display a game interface including a matrix having a plurality of matrix positions, a memory device, and a processor in communication with the game display and the memory device, the processor configured to:
    in response to a game instance of a base game, determine that at least one bonus game initiating symbol associated with a bonus game is displayed in the matrix;
    in response to a bonus game initiating symbol being displayed in matrix, determine that at least a first base prize symbol is displayed in a first matrix position of the matrix, the first base prize symbol associated with causing an awarding of a first prize amount;
    cause the game display to display, in the first matrix position, a first transparent prize symbol, the first transparent prize symbol being associated with the first prize amount;
    select a lookup table based at least in part on a number of transparent prize symbols currently displayed;
    in response to a bonus game instance, generate at least one special symbol in the matrix based on an analysis of a random number generator (RNG) call with respect to the selected lookup table;
    determine that the at least one special symbol is displayed in the first matrix position that includes the first transparent prize symbol; and
    in response to the determination that the at least one special symbol is displayed in the first matrix position, display a second transparent prize symbol in the first matrix position, the second transparent prize symbol associated with causing an awarding of a second prize amount greater than the first prize amount.

2. The gaming device of claim 1, wherein the processor is further configured to:
    calculate a total displayed value based at least in part on the second prize amount of the second transparent prize symbol; and
    transfer the total displayed value to a player credit balance.

3. The gaming device of claim 1, wherein the processor is further configured to, in response to generating at least one special symbol in a second matrix position not including a transparent credit value symbol, generate a new transparent prize symbol in the second matrix position.

4. The gaming device of claim 2, wherein the processor is further configured to select a new prize value associated with the new transparent prize symbol.

5. The gaming device of claim 4, wherein to select the new prize value, the processor is configured to:
perform a random number generator (RNG) call; and
select the new prize based on the RNG call and a lookup table.

6. The gaming device of claim 1, wherein the processor is further configured to:
in response to the bonus game initiating symbol being displayed, determine a number of bonus game spin credits;
in response to the bonus game instance, decrement the number of bonus game spin credits; and
in response to the number of bonus game spin credits reaching zero, calculate a total displayed value.

7. The gaming device of claim 6, wherein to determine the number of bonus game spin credits, the processor is configured to determine the number of bonus game spin credits based on a number of bonus game initiating symbols displayed in the matrix.

8. The gaming device of claim 6, wherein the processor is further configured to:
in response to the bonus game instance, determine that a combination of special symbols is displayed in the matrix, and
increment the bonus game spin credits in response to the determination that the combination of special symbols is displayed in the matrix.

9. The gaming device of claim 1, wherein the memory device is configured to store a plurality of jackpot values, and wherein the first prize value associated with the first transparent prize symbol corresponds to a first jackpot value of the a plurality of jackpot values.

10. The gaming device of claim 9, wherein the second prize value corresponds to a second jackpot value of the plurality of jackpot values.

11. The gaming device of claim 1, wherein the processor is further configured to:
in response to determining a bonus game initiating symbol is displayed, determine that at least a first base credit value symbol is displayed in a second matrix position of the matrix, the first base credit value symbol associated with a first credit value;
cause the game display to display, in the second matrix position, a first transparent credit value symbol associated with the first credit value;
determine that the at least one special symbol is displayed in the second matrix position that includes the first transparent credit value symbol; and
in response to the determination that the at least one special symbol is displayed in the second matrix position, increase the first credit value to a second credit value.

12. The gaming device of claim 11, the processor is further configured to apply a multiplier to the first credit value to increase the first credit value to the second credit value.

13. The gaming device of claim 1, wherein the processor is further configured to:
in response to the bonus game instance, analyze an RNG call with respect to a separate lookup table of a plurality of lookup tables for each column of the matrix; and
generate the at least one special symbol based on the analysis of the RNG call for each column.

14. The gaming device of claim 13, wherein each lookup table of the plurality of lookup tables corresponds to a different probability of displaying the at least one special symbol.

15. The gaming device of claim 1, wherein the processor is further configured to:
select the lookup table further based at least in part on a prize amount currently associated with the first transparent prize symbol; and
generate the at least one special symbol based on an analysis of an RNG call with respect to the selected lookup table.

16. A method performed by a gaming system that includes a processor in communication with a memory device and a game display configured to display a game interface including a matrix having a plurality of matrix positions, the method comprising:
determining that at least one bonus game initiating symbol associated with a bonus game is displayed in the matrix by the game display;
in response to the bonus game initiating symbol being displayed in the matrix, identify a first base prize symbol that is displayed in a first matrix position of the matrix by the game display, the first base prize symbol associated with causing an awarding of a first prize amount;
causing the game display to display, in the first matrix position, a first transparent prize symbol, the first transparent prize symbol being associated with the first prize amount;
selecting a lookup table based at least in part on a number of transparent prize symbols currently displayed;
causing the game display to generate at least one special symbol in the matrix based on an analysis of a random number generator (RNG) call with respect to the selected lookup table;
determining that the at least one special symbol is displayed in the first matrix position that includes the first transparent prize symbol; and
in response to the determination that the at least one special symbol is displayed in the first matrix position, causing the game display to display a second transparent prize symbol in the first matrix position, the second transparent prize symbol associated with causing an awarding of a second prize amount greater than the first prize amount.

17. The method of claim 16, further comprising:
in response to a bonus game instance, analyzing an RNG call with respect to a separate lookup table of a plurality of lookup tables for each column of the matrix; and
generating the at least one special symbol based on the analysis of the RNG call for each column.

18. At least one non-transitory computer-readable media having computer-executable instructions embodied thereon, wherein when executed by a processor in communication with a memory device and a game display configured to display a game interface including a matrix having a plurality of matrix positions, the computer-executable instructions cause the processor to:
determine that at least one bonus game initiating symbol associated with a bonus game is displayed in the matrix;
in response to a bonus game initiating symbol being displayed in matrix, determine that at least a first base prize symbol is displayed in a first matrix position of the matrix, the first base prize symbol associated with causing an awarding of a first prize amount;

cause the game display to display, in the first matrix position, a first transparent prize symbol, the first transparent prize symbol being associated with the first prize amount;

select a lookup table based at least in part on a number of transparent prize symbols currently displayed;

generate at least one special symbol in the matrix based on an analysis of a random number generator (RNG) call with respect to the selected lookup table;

determine that the at least one special symbol is displayed in the first matrix position that includes the first transparent prize symbol; and in response to the determination that the at least one special symbol is displayed in the first matrix position, display a second transparent prize symbol in the first matrix position, the second transparent prize symbol associated with causing an awarding of a second prize amount greater than the first prize amount.

\* \* \* \* \*